United States Patent
Plom et al.

(10) Patent No.: US 10,750,115 B1
(45) Date of Patent: Aug. 18, 2020

(54) VIDEO SUGAR CAPTURE

(71) Applicant: Twitter, Inc., San Francisco, CA (US)

(72) Inventors: Richard Plom, San Francisco, CA (US); Reed Martin, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/438,389

(22) Filed: Jun. 11, 2019

(51) Int. Cl.
  *H04N 5/77* (2006.01)
  *H04N 5/232* (2006.01)
  *G11B 27/031* (2006.01)
  *H04N 5/935* (2006.01)
  *H04N 21/4223* (2011.01)
  *H04N 21/2743* (2011.01)

(52) U.S. Cl.
  CPC ........... *H04N 5/772* (2013.01); *G11B 27/031* (2013.01); *H04N 5/232933* (2018.08); *H04N 5/232939* (2018.08); *H04N 21/2743* (2013.01); *H04N 21/4223* (2013.01)

(58) Field of Classification Search
  CPC ...... H04N 5/23222; H04N 5/772; H04N 5/91; H04N 5/3216; H04N 21/2743; H04N 5/232933; H04N 5/232939; H04N 21/4223; G11B 27/031
  USPC ................ 386/224, 230, 210, 239, 278, 282
  See application file for complete search history.

(56) References Cited

U.S. PATENT DOCUMENTS

| | | | | |
|---|---|---|---|---|
| 9,412,372 | B2* | 8/2016 | Henry | G10L 15/265 |
| 2013/0101219 | A1* | 4/2013 | Bosworth | G06K 9/00677 |
| | | | | 382/195 |
| 2016/0196044 | A1* | 7/2016 | McGill | H04N 5/262 |
| | | | | 715/720 |

OTHER PUBLICATIONS

Arlo Pro 2 HD Security Camera System User Manual, Arlo Technologies, Inc., Feb. 2019, 19 pages.
Elliot, Matt, "How to use Capture to start recording iPhone video fast," c/net.com [online], Nov. 22, 2011, retrieved on Oct. 8, 2019 from URL <https://www.cnet.com/how-to/how-to-use-capture-to-start-recording-iphone-video-fast/>, 3 pages.
Moon, Brad, "How (and Why) To Turn Off Live Photos On Your iPhone," Forbes.com, Nov. 11, 2016, retrieved from the internet on Dec. 16, 2019 at URL <https://www.forbes.com/sites/bradmoon/2016/11/11/how-and-why-to-turn-off-live-photos-on-your-iphone/#7e9b90321600>, 4 pages.

* cited by examiner

*Primary Examiner* — Robert Chevalier
(74) *Attorney, Agent, or Firm* — Fish & Richardson P.C.

(57) ABSTRACT

Methods, systems, and apparatus, including computer programs encoded on computer storage media, for capturing video on a mobile device. In an example mobile device, an activation action puts the device in a state in which it captures a loop of video of predefined length and uses that as a prefix to a video recorded in response to a record video action.

28 Claims, 2 Drawing Sheets

VIDEO SUGAR CAPTURE

BACKGROUND

This specification relates to capturing videos on personal devices and, in some aspects, to publishing such videos.

Technology on personal devices and supporting services give users an ability to capture and share video. Typically, camera operations start and stop capturing or sharing video at the time of a user's actions, e.g., pressing a start and stop record button. In some instances, it is hard for a user to act at precisely the right time to start or stop capturing, or even to know when the precisely right time is. The same difficulty can exist when streaming video. It may also happen that a delay exists between the launch of a service or application and the ability to start capturing or sharing video using that service or application.

Social messaging platforms and network-connected personal computing devices allow users to create and share such content across multiple devices in real-time.

Sophisticated mobile computing devices such as smartphones and tablets make it easy and convenient for people, companies, and other entities to use social networking messaging platforms and applications. Popular social messaging platforms generally provide functionality for users to draft and post messages and video content, both synchronously and asynchronously, to other users. Other common features include the ability to post content to be visible to one or more identified other users of the platform, or even publicly to any user of the platform without specific designation by the authoring user. Examples of popular social messaging platforms include Facebook, Instagram, Pinterest, and Twitter. ("Facebook" is and "Instagram" area trademarks of Facebook, Inc. "Pinterest" is a trademark of Pinterest, Inc. "Twitter" is a trademark of Twitter, Inc.)

SUMMARY

This specification describes technologies for capturing video on a mobile device.

In general, one innovative aspect of the subject matter described in this specification can be embodied in a mobile device that has a camera, a display, and a graphical user interface operating under control of software running on one or more processors in the mobile device. The software is configured to perform operations that include (i) receiving an activation action from a user of the mobile device placing the software in a prefix-active state; (ii) while the software is in the prefix-active state, continually capturing, through the camera, and recording a loop of prefix video covering an immediately preceding window of a predetermined prefix duration; (iii) receiving a start recording action from the user, and in response, (i) terminating the capturing of the prefix video, and (ii) until receiving a stop recording action from the user, capturing and recording a video segment through the camera that begins with the loop of prefix video and continues until the stop recording action is received; (iv) receiving a stop recording action from the user and, in response, terminating the capturing and recording of the video segment; (v) displaying a representation of the video segment on the display on the graphical user interface with an upload user interface element that the user can use to upload the video segment; and (vi) uploading the video segment to a server in response to a user action on the upload user interface element.

The subject matter described in this specification as implemented in particular embodiments realizes one or more of the following technical advantages. A mobile device can capture a scene, an event, or an incident from its beginning without requiring the user of the device to record continuously. A mobile device can upload a video in real time that includes material that occurred before the user explicitly started recording. The ability to use a prefix to a video requires only a minimal and user-selectable amount of memory on the mobile device.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
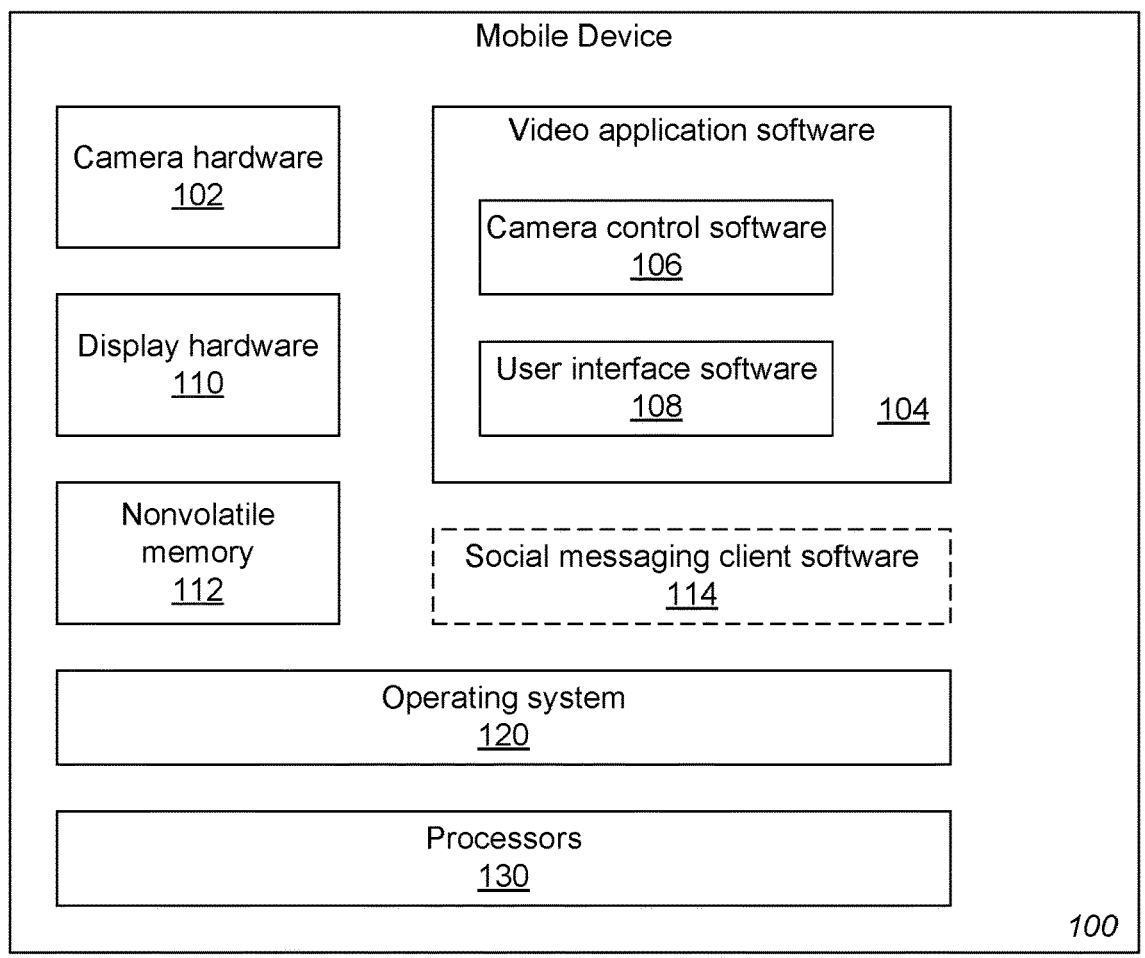
FIG. 1 is a block diagram of a mobile device configured to perform the video capture and other device operations described in this specification.

FIG. 1 is a block diagram of an example mobile device 100 configured to perform the video capture and other device operations described in this specification.

The device includes camera hardware 102, including one or more lenses, sensors, and image signal processors operating under control of camera control software 106, which is part of video application software 104 installed on the device. Alternatively, the video application software may be implemented as code in a web page running in a web browser environment. The device also includes display hardware 110 for displaying images and user interface elements. The display hardware includes a display screen that advantageously is a touch screen for receiving user input, e.g., as gestures or as actions on interface elements, e.g., as buttons or sliders, or as inputs to a virtual keyboard, in a graphical user interface. The user interface is controlled by user interface software 108, which is part of the video application software. In some devices, the device may have physical buttons and other physical user interface that a user can use to interact with the user interface software. The device includes nonvolatile memory 112 which is used, among other things, for storing video files as determined by the video application software. The device also generally includes wireless communication hardware and software for communicating with a data communication network over a Wi-Fi or cell phone connection.

The software on the device interacts with the hardware through hardware interfaces, through an operating system 120 installed on the device, or both. The operating system and the software are generally implemented as modules of computer program instructions that are executed by one or more processors 130 on the device.

Examples of suitable devices include smartphones, digital pocket camcorders, with or without wireless or mobile phone capability, personal action cameras, with or without wireless or mobile phone capability, and similar devices. Other examples include multi-part devices, for example, a combination of a video camera equipped quadcopter or other kind of drone and a controller, e.g., one implemented in software on a smartphone or electronic tablet, or on any other form of computer.

The device optionally includes social messaging client software 114 that is configured to interact with a corresponding social messaging server system, e.g., a Twitter client and a Twitter host, respectively, of a social messaging platform. Popular social messaging platforms generally provide functionality for users to draft and post messages, including video content, both synchronously and asynchronously, to other users. That is, the platforms are configured to enable users to exchange messages in real-time, i.e., with a minimal delay, what is essentially a live conversation between the users, or to respond to messages posted earlier, on the order of hours or days or even longer. Other common features include the ability to post messages that are visible to one or more identified other users of the platform, or even publicly to any user of the platform without specific designation by the authoring user.

The video application software may be implemented as part of social messaging client software installed on mobile devices. In operation, the social messaging client software can access the social messaging platform so that a user can post and receive messages, view and curate the user's streams, and view and interact with lists of content items. On any particular user device, the social messaging client software may be a web browser or an HTML (hypertext markup language) document rendered by a web browser. Or the social messaging client software may be or include JavaScript code or Java code. Or the it may be dedicated software, e.g., an installed app or installed application, that is designed to work specifically with the platform.

Among the capabilities implemented by the software on the mobile device is the ability for a user to use the software to upload a video to a server system.

Figure 2:
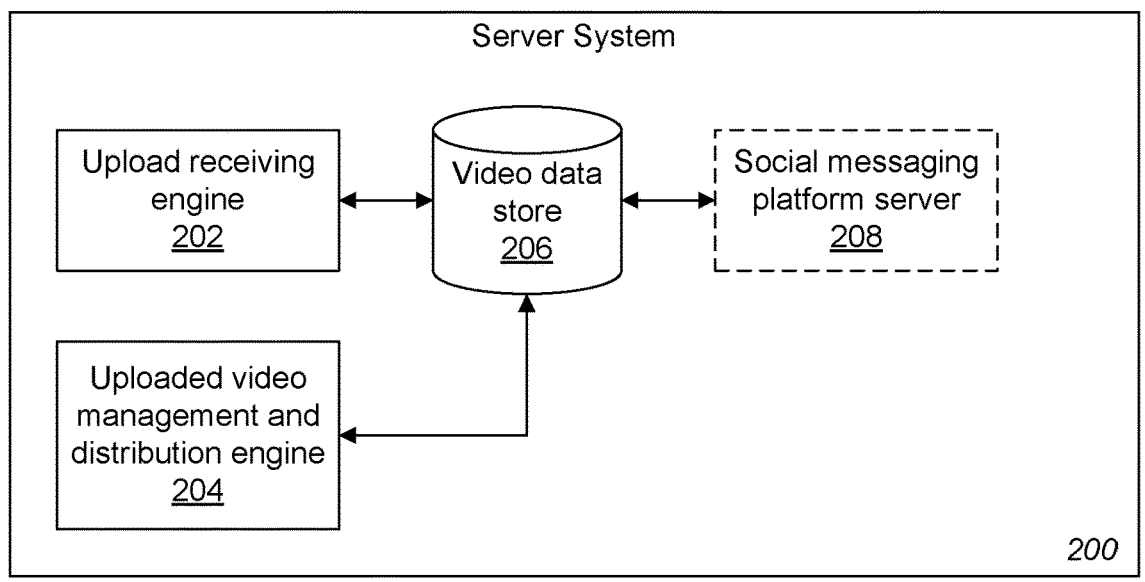
FIG. 2 is a block diagram of a server system configured to receive videos from mobile devices.

FIG. 2 is a block diagram of an example server system 200 configured to receive videos from mobile devices, for example, the mobile devices described in reference to FIG. 1.

The server system is implemented on one or more computers operating in one or more locations that are configured to operate as one or more servers that support connections over data communication networks from multiple user devices, including connections from the mobile devices described in reference to FIG. 1.

The mobile devices and the server system are configured to enable users to use the devices and the system to upload videos from the devices to the server system over data communication networks and to manage at least the storage and distribution of the videos.

The server system thus includes at least an upload receiving engine 202 and an uploaded video management and distribution engine 204. In this specification the term "engine" is used to refer broadly to a software-based system, subsystem, or process that is programmed to perform specific functions. The engines just mentioned may be implemented as one or more software modules or components, installed on one or more computers in one or more locations. In some cases, one or more computers will be dedicated to a particular engine; in other cases, multiple engines can be installed and running on the same computer or computers.

The server system also includes a video data store 206, i.e., data storage devices coupled to communicate with one or more of the computers of the server system to store videos uploaded by users, including videos upload from mobile devices described in reference to FIG. 1.

The server system optionally includes a social messaging platform server 208, which is a software engine implemented on one or more of the computers of the server system. The upload receiving engine and the uploaded video management and distribution engine may be incorporated in the platform server as components or as functionality implemented in other components of the platform server.

The platform server is configured to provide content, generally messages, which may include videos from the video data store, to a requesting user in a home feed message stream. The messages will generally be messages from accounts the user is following, meaning that the recipient account has registered to receive messages posted by the followed account, and optionally content that the user or such followed accounts have engaged with, e.g., endorsed. Optionally, the platform server is configured to include, in a recipient user's home feed stream, messages that the platform determines are likely to be of interest to the recipient.

The platform server is configured to provide functionality that enables users to draft and post messages, including video content, both synchronously and asynchronously, to sender-specified other users. This enables users to exchange messages in real-time, i.e., with a minimal delay. Other common features include the ability to post messages that are visible to one or more identified other users of the platform, or even publicly to any user of the platform without specific designation by the authoring user.

The platform may have many millions of accounts, and anywhere from hundreds of thousands to millions of connections may be established or in use between clients and the platform at any given moment.

Figure 3:
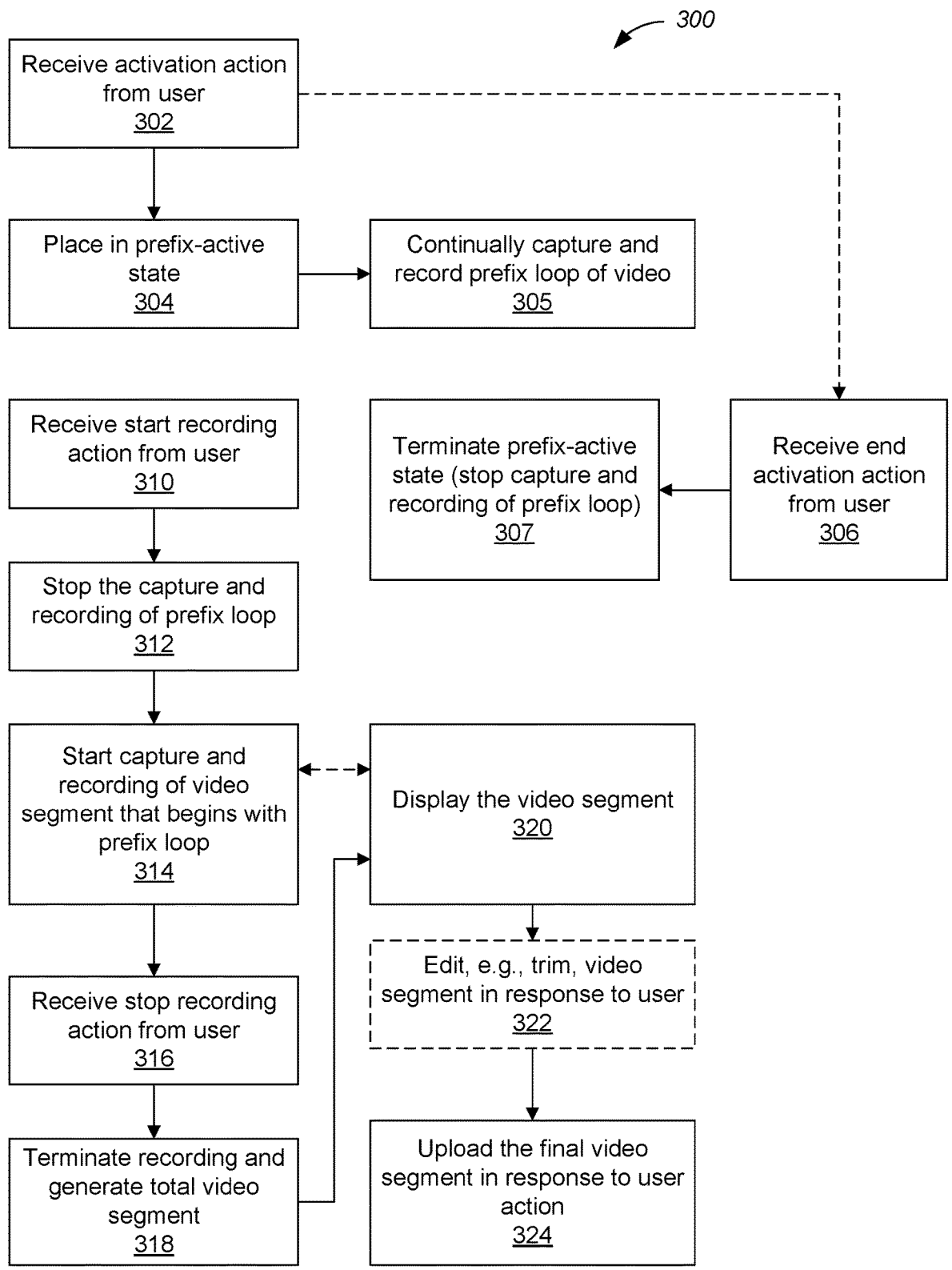
FIG. 3 is a flowchart of an example process 200 for capturing video as performed by a mobile device.

FIG. 3 is a flowchart of an example process 300 for capturing video as performed by a mobile device. For example, the mobile devices described in reference to FIG. 1, appropriately programmed, can perform the process. The process will be described as being performed by such a device.

The process receives an activation action from a user of the mobile device (302). The activation action can be an action performed on an activation user interface element of a graphical user interface of the video application software. It can also be an action that opens a video app that implements the process, e.g., an action that selects an icon on a user interface of the device, e.g., of a smartphone.

As a result, the device is put in a prefix-active state (304). In this state, the process continually captures and records a prefix loop of video covering an immediately preceding window of a predetermined prefix duration (305). The prefix loop is stored in a nonvolatile memory or in a volatile memory of the device. The memory is optionally a memory dedicated to storing video data captured by the camera hardware of the device. The predetermined prefix duration can optionally be set by a user of the device to a value selected by the user, e.g., through the video application software graphical user interface. In the absence of a user selection, a default value, e.g., a value between three and six seconds, may be used; alternatively, a default value of zero seconds may be used to ensure that the user intentionally enables the capturing of a prefix loop.

The prefix loop may be stored in a variety of ways. For example, it may be stored as a sequence of small video files, e.g., of one second in length, keeping only the most recent files and deleting the rest so as to have stored at least the predetermined prefix duration of video to use as the prefix loop.

When the process receives a start recording action from the user through the user interface (310), the process stops the capture and recording of the prefix loop (312) and starts the capture and recording of a video segment that begins with prefix loop (314). This can be done in a variety of ways. For example, if the prefix loop is captured as small video files, the process can continue recording into the small video file currently being recorded, which would make that file larger to contain a last portion of the prefix loop and the video data being captured by the camera, until the process receives a stop recording action from the user (316). Alternatively, the currently recorded small file can be closed and recording can continue into a new video file. The total video segment can then be generated by merging the earlier small video files of the prefix loop with the last recorded file (318).

Optionally, while the user-requested video is being captured and recorded, the video application software can, at the request of the user, display what is being recorded (320). In such implementations, editing, to trim the beginning of the video, for example, can be made available through the user interface while the video is being recorded.

When the total video segment has been generated, the process can display the video segment through the graphical user interface in whatever way the user selects (320). The video application software can optionally provide tools, accessible through graphical user interface elements, that enable the user to trim and, in some implementations, otherwise edit, the video segment, to generate a final video segment (322).

The process can then upload the final video segment to a server system (324), e.g., the system described in reference to FIG. 2, for further processing or distribution.

The process, in cooperation with a server system, can optionally also implement an action to upload video. If this is implemented, the user can request, through the user interface, that the process upload the total video segment in close to real time as it is being captured, either after the user has trimmed the beginning of the video, perhaps to shorten or eliminate the prefix loop, or without any trimming or any delay before uploading. The video application software can optionally provide a user the ability to request that the upload of a video begin when the user makes a start recording action, in which case the uploaded video will lag the recorded video, at least initially, by the time duration of the prefix loop.

The process, when it receives an end activation action through the graphical user interface (306), terminates the prefix-active state and thereby stops the capture and recording of the prefix loop (307). The process can be implemented to treat a start recording action from the user as an end activation action. The process can be implemented to treat an end recording action as an activation action that starts a capture and recording of a new prefix loop.

In some implementations in which the device includes social messaging client software, that software is configured to receive a request from a user to post a final video segment as user content on the corresponding social messaging platform. The client software may be configured to accept such a request after the video is complete, while a video is being captured, or as a configuration setting under which the uploading and posting occur as a result of a start recording action by the user. The video application software and the social messaging client software, as the case may be, can optionally make the automatic uploading and be subject to the condition that a mobile network connection with sufficient bandwidth is available to the mobile device, or that a Wi-Fi connect is available.

In order to protect a user of the mobile device from inadvertently making recordings, in some implementations the device is programmed so that entry in a prefix-active state is blocked, i.e., the prefix-recording feature is dormant, i.e., not enabled, by default, and must be explicitly enabled by the user. Optionally, and advantageously, the feature returns to a dormant state after it has not been used for a predetermined period of time, or after the device has been restarted. Optionally, and advantageously, in some implementations, when the feature is enabled, the process 300 notifies the user by producing a distinctive signal on the device, e.g., by producing a notification sound or a flashing display object or a vibration. Alternatively, the process can notify the user in this way, when an activation action (302) has occurred, to let the user know that recording is taking place. The process can stop this notification when the user takes an explicit action to continue recording or to stop recording.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus, e.g., data processing apparatus embedded in a mobile device. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A mobile device comprising a camera, a display, and a graphical user interface operating under control of software running on one or more processors in the mobile device, the software being configured to perform device operations comprising:

receiving an activation action from a user of the mobile device placing the software in a prefix-active state;

while the software is in the prefix-active state, continually capturing, through the camera, and recording a loop of prefix video covering an immediately preceding window of a predetermined prefix duration;

receiving a start recording action from the user, and in response, (i) terminating the capturing of the prefix video, and (ii) until receiving a stop recording action from the user, capturing and recording a video segment through the camera that begins with the loop of prefix video and continues until the stop recording action is received;

receiving a stop recording action from the user and, in response, terminating the capturing and recording of the video segment;

displaying a representation of the video segment on the display on the graphical user interface with an upload user interface element that the user can use to cause the software to upload the video segment; and uploading the video segment to a server in response to a user action on the upload user interface element.

2. The mobile device of claim 1, wherein the device operations further comprise:

displaying a representation of the video segment on the display on the graphical user interface with user interface elements that the user can use to cause the software to trim a beginning of the video segment, to trim an end of the video segment, and to upload the video segment; and trimming and uploading the video segment to a server in response to a user action on the graphical user interface.

3. The mobile device of claim 1, wherein the device operations further comprise:

receiving an input setting the prefix duration through the graphical user interface.

4. The mobile device of claim 1, wherein:
the prefix duration is between three and six seconds.

5. The mobile device of claim 1, wherein:
the start recording action is the user holding down a record button on the mobile device;
the stop recording action is the user releasing the record button on the mobile device; and
the record button is a physical button on the mobile device or a virtual button on the graphical user interface.

6. The mobile device of claim 1, wherein:
the start recording action is the user tapping a record button on the mobile device;
the stop recording action is the user tapping the record button again or tapping a stop button on the mobile device; and
the record button and the stop button are physical buttons on the mobile device or virtual buttons on the graphical user interface.

7. The mobile device of claim 1, wherein:
the activation action is an action performed on an activation user interface element of the graphical user interface.

8. The mobile device of claim 1, wherein the device operations comprise:
in response to receiving the stop recording action, terminating the prefix-active state.

9. The mobile device of claim 1, wherein the device operations comprise:

receiving an end activation action and in response, terminating the prefix-active state.

10. The mobile device of claim 1, wherein:
the mobile device is a smartphone or an electronic tablet and the software comprises a video app installed on the smartphone or the electronic tablet; and
the activation action is an action of opening the video app on the mobile device.

11. The mobile device of claim 1, wherein:
the user interface element to trim a beginning of the video segment is active while the video segment is being captured.

12. The mobile device of claim 1, wherein the device operations comprise:
storing the prefix loop in memory as multiple small video files, wherein an actual time duration of the prefix video may be longer than the prefix duration by a length of one of the small video files.

13. A system comprising the mobile device of claim 1 and further comprising:

a server of a social messaging platform comprising one or more computers configured to perform server operations comprising:
receiving an upload of a video segment from the mobile device;
storing the video segment; and
providing the video segment in a message to particular accounts of the social messaging platform.

14. The system of claim 13, wherein the particular accounts comprise accounts that are following the user of the mobile device.

15. The system of claim 13, wherein the particular accounts are accounts selected, by the user of the mobile device to receive the message.

16. One or more non-transitory computer-readable storage media encoded with software that, when executed by one or more computers embedded in a mobile device that comprises a camera, a display, and a graphical user interface, cause the mobile device to perform device operations comprising:

receiving an activation action from a user of the mobile device placing the mobile device in a prefix-active state;

while the mobile device is in the prefix-active state, continually capturing, through the camera, and recording a loop of prefix video covering an immediately preceding window of a predetermined prefix duration;

receiving a start recording action from the user, and in response, (i) terminating the capturing of the prefix video, and (ii) until receiving a stop recording action from the user, capturing and recording a video segment through the camera that begins with the loop of prefix video and continues until the stop recording action is received;

receiving a stop recording action from the user and, in response, terminating the capturing and recording of the video segment;

displaying a representation of the video segment on the display on the graphical user interface with an upload user interface element that the user can use to cause the mobile device to upload the video segment; and uploading the video segment to a server in response to a user action on the upload user interface element.

17. The one or more non-transitory computer-readable storage media of claim 16, wherein the device operations further comprise:

displaying a representation of the video segment on the display on the graphical user interface with user interface elements that the user can use to cause the mobile device to trim a beginning of the video segment, to trim an end of the video segment, and to upload the video segment; and trimming and uploading the video segment to a server in response to a user action on the graphical user interface.

18. The one or more non-transitory computer-readable storage media of claim 16, wherein the device operations further comprise:

receiving an input setting the prefix duration through the graphical user interface.

19. The one or more non-transitory computer-readable storage media of claim 16, wherein the device operations further comprising:

storing the prefix loop in memory as multiple small video files, wherein an actual time duration of the prefix video may be longer than the prefix duration by a length of one of the small video files.

20. A method performed by a mobile device that comprises a camera, a display, and a graphical user interface, the method comprising:

receiving an activation action from a user of the mobile device placing the mobile device in a prefix-active state;

while the mobile device is in the prefix-active state, continually capturing, through the camera, and recording a loop of prefix video covering an immediately preceding window of a predetermined prefix duration;

receiving a start recording action from the user, and in response, (i) terminating the capturing of the prefix video, and (ii) until receiving a stop recording action from the user, capturing and recording a video segment through the camera that begins with the loop of prefix video and continues until the stop recording action is received;

receiving a stop recording action from the user and, in response, terminating the capturing and recording of the video segment;

displaying a representation of the video segment on the display on the graphical user interface with an upload user interface element that the user can use to cause the mobile device to upload the video segment; and uploading the video segment to a server in response to a user action on the upload user interface element.

21. The one or more non-transitory computer-readable storage media of claim 16, wherein:

the prefix duration is between three and six seconds.

22. The one or more non-transitory computer-readable storage media of claim 16, wherein:

the start recording action is the user holding down a record button on the mobile device;

the stop recording action is the user releasing the record button on the mobile device; and the record button is a physical button on the mobile device or a virtual button on the graphical user interface.

23. The one or more non-transitory computer-readable storage media of claim 16, wherein:

the start recording action is the user tapping a record button on the mobile device;

the stop recording action is the user tapping the record button again or tapping a stop button on the mobile device; and the record button and the stop button are physical buttons on the mobile device or virtual buttons on the graphical user interface.

24. The one or more non-transitory computer-readable storage media of claim 16, wherein:

the activation action is an action performed on an activation user interface element of the graphical user interface.

25. The one or more non-transitory computer-readable storage media of claim 16, wherein the device operations further comprise:

in response to receiving the stop recording action, terminating the prefix-active state.

26. The one or more non-transitory computer-readable storage media of claim 16, wherein the device operations further comprise:

receiving an end activation action and in response, terminating the prefix-active state.

27. The one or more non-transitory computer-readable storage media of claim 16, wherein:

the mobile device is a smartphone or an electronic tablet and the software comprises a video app installed on the smartphone or the electronic tablet; and the activation action is an action of opening the video app on the mobile device.

28. The one or more non-transitory computer-readable storage media of claim 16, wherein the device operations further comprise:

keeping the user interface element to trim a beginning of the video segment active while the video segment is being captured.

* * * * *

UNITED STATES PATENT AND TRADEMARK OFFICE
CERTIFICATE OF CORRECTION

PATENT NO. : 10,750,115 B1  
APPLICATION NO. : 16/438389  
DATED : August 18, 2020  
INVENTOR(S) : Richard Plom and Reed Martin It is certified that error appears in the above-identified patent and that said Letters Patent is hereby corrected as shown below:

On the Title Page

Item (54), and in the Specification, Column 1 (Title), Line 1, delete "SUGAR" and insert -- SUPER --, therefor.

In the Claims

Column 10, Line 34, Claim 15, delete "selected," and insert -- selected --, therefor.

Column 11, Line 15, Claim 19, delete "comprising:" and insert -- comprise: --, therefor.

Signed and Sealed this  
Twentieth Day of October, 2020

Andrei Iancu  
*Director of the United States Patent and Trademark Office*